United States Patent

Busenbender et al.

[11] Patent Number: 6,001,498
[45] Date of Patent: Dec. 14, 1999

[54] FUEL CELL ARRANGEMENT WITH GRAVITY-DRIVEN CIRCULATION SYSTEM

[75] Inventors: Ilona Busenbender, Aachen; Hendrik Dohle, Eschweiler; Thorsten Kels, Juelich-Broich; Volker Peinecke, Aachen, all of Germany

[73] Assignee: Forschungszentrum Jülich GmbH, Jülich, Germany

[21] Appl. No.: 08/949,934

[22] Filed: Oct. 14, 1997

[30] Foreign Application Priority Data

Oct. 16, 1996 [DE] Germany ............... 196 42 754

[51] Int. Cl.⁶ ........................................... H01M 8/04
[52] U.S. Cl. ................................. 429/17; 429/26
[58] Field of Search ................... 429/14, 17, 20, 429/24, 26

[56] References Cited

U.S. PATENT DOCUMENTS

| | | |
|---|---|---|
| 3,979,225 | 9/1976 | Smith et al. ............... 429/17 |
| 4,075,396 | 2/1978 | Grehier ..................... 429/17 |
| 4,128,700 | 12/1978 | Sederquist ................. 429/17 |
| 4,362,789 | 12/1982 | Dighe ....................... 429/17 |
| 4,713,303 | 12/1987 | Farooque et al. .......... 429/26 |
| 4,859,545 | 8/1989 | Scheffler et al. ........... 429/17 |
| 5,340,663 | 8/1994 | Buswell et al. ............. 429/17 |

*Primary Examiner*—Maria Nuzzolillo
*Assistant Examiner*—Monique M. Wills
*Attorney, Agent, or Firm*—Klaus J. Bach

[57] ABSTRACT

In a fuel cell arrangement with at least one fuel cell operated by a fuel and an oxidizing agent, means are provided for effecting gravity driven circulation of the fuel and the oxidizing agent through the fuel cell so that no pumping means, which consume power and need servicing, are required.

2 Claims, 1 Drawing Sheet

FUEL CELL ARRANGEMENT WITH GRAVITY-DRIVEN CIRCULATION SYSTEM

BACKGROUND OF THE INVENTION

The invention relates to a fuel cell. A fuel cell includes a cathode, an electrolyte and an anode. The cathode is supplied with a fuel such as hydrogen.

There are various types of fuel cells, for example, SOFC fuel cells or PEM fuel cells.

A SOFC fuel cell is also called high temperature fuel cell, since its operating temperature is about 900° C. At the cathode of a high temperature fuel cell, oxygen ions are formed in the presence of an oxidizing agent. The oxygen ions pass through the electrolyte and recombine at the anode side with the hydrogen from the fuel to form water. During recombination, electrons are released, whereby electric energy is generated.

The operating temperature of a PEM fuel cell is about 80° C. In the presence of fuel hydrogen ions are formed at the anode of a PEM fuel cell by means of a catalyst. The hydrogen ions pass through the electrolyte and are combined with the oxygen from the oxidizing agent to form water. In the process, electrons are released whereby electric energy is generated. Hydrogen can be produced by reforming from methanol or methane.

For the generation of a large power output, several fuel cells are generally serially connected to form a so-called fuel cell stack. The element interconnecting two fuel cells is known as an interconnector.

In order to introduce the oxidizing agent and the fuel into a fuel cell or, respectively, into a fuel cell stack, pumps compressors or other pumping means are required. Depending on the type of the fuel cell unconsumed oxidizing agent and unconsumed fuel are subsequently conducted out of the fuel cell.

If pumps or similar means are used for moving the fuel and oxidizing agents through the fuel cell, the efficiency of the fuel cell is detrimentally affected since pumps consume usable (electric) energy. With pumps, furthermore, the number of moving components is increased which a fuel cell or fuel cell stack includes. A large number of moving parts is disadvantageous since the reliability of such an apparatus decreases and its costs increase with an increasing number of moving parts.

JB 59-8278(A) (Patent Abstracts of Japan, E-240 of Apr. 21, 1984, Vol. 8, No. 88) discloses an arrangement for transporting the required media through the fuel cell by convection with the aid of heating elements. However, such heating elements also consume energy and consequently, they detrimentally affect the efficiency of the whole apparatus.

It is the object of the present invention to provide a fuel cell which has a greater efficiency than the fuel cells known in the art and which furthermore is more reliable.

SUMMARY OF THE INVENTION

In a fuel cell arrangement with at least one fuel cell operated by a fuel and an oxidizing agent, means are provided for generating gravity driven circulation of the fuel or the oxidizing agent through the fuel cell so that no pumping means, which consume power and require servicing, are required.

Because no power is consumed for moving the fuel and/or the oxidizing agent through the cells the efficiency of such fuel cells is increased and because operation is without pressurization and because there are only few moving parts, the fuel cell is inexpensive and highly reliable requiring little service.

If pressurization is desired for increased performance, the whole apparatus is placed under pressure.

Means for providing gravity driven material transport in the sense of the invention are present if the material transport is mostly, preferably fully, based on gravity.

The means for a gravity driven material transport in fuel cells with a fuel or oxidizing agent circulating circuit are provided as follows:

The fuel and/or oxidizing agent circuit includes an upper and a lower reversal point. In the upper reversal point, fuel or oxidizing agent flowing counter to the gravity forces begins to flow in the direction of the gravity forces. The opposite applies to the lower reversal point.

The fuel cell and the means for removing the heat are so arranged that, in the circulation system, the fuel or oxidizing agent are circulated by gravity forces. Means for removing the heat are present which provide for removal of heat from the circulating systems under operating conditions.

The gravity driven circulation is obtained specifically by an arrangement of the fuel cells between the upper and the lower reversal points. This involves an arrangement wherein the fuel or the oxidizing agent passes through the fuel cell after passing through the lower reversal point and before passing through the upper reversal point. The fuel or the oxidizing agent are heated while passing through the fuel cell whereby the gravity driven flow of the fuel or the oxidizing agent through the fuel cell is maintained.

The gravity driven flow through the fuel cell is further supported by the arrangement of the means for removing the heat between the lower and upper reversal points. In this arrangement, the fuel or oxidizing agent pass through means for removing heat after passing the upper reversal point and before passing the lower reversal point.

The means for removing the heat may consists of cooling fins or a cooling coil. The circulating duct structure itself may have, between the upper and the lower reversal points, the form of a coil or it may have a zig-zag shape. The coil or zig-zag shape provides for a relatively large heat exchange surface area. In this way, a larger amount of heat can be transferred to the (cooler) environment as compared to a return duct extending in a straight line between the upper and the lower reversal points.

Preferably, the fuel cells and/or the means for removing heat occupy more than 80% of the distance (straight line) between the lower and the upper reversal points. Then the gravity forces are particularly effective for the transport of the fuel or the oxidizing agent.

In the area of the upper reversal point, the heated fuel or the heated oxidizing agent are cooled. As a result, the fuel or oxidizing agents density and weight are increased after passing the upper reversal point so that they flow downwardly. In this way, a gravity driven flow of fuel or oxidizing agent through the fuel cell is generated. The gravity driven flow through the fuel cells with circulating system is particularly suitable for liquids such as liquid methanol used as fuel.

With gaseous fuels or oxidizing agents, the following arrangement of the means for generating a gravity driven flow through the fuel cells is preferred. The gas flow through the fuel cell is opposite to the gravity forces. In the lower part of the fuel cell, the gas is heated. By the well known chimney effect, the gas flows upwardly through the fuel cell without the use of a pump or a compressor.

In a preferred embodiment, a fuel cell stack or a fuel cell has an elongated shape. Elongated in this connection means that the spatial dimensions in one direction are greater by a multiple, that is five, or preferably, ten times greater than that in any other spatial direction. The fuel or oxidation agent is then guided through the fuel cell parallel to the longitudinal extension of the fuel cell, which is disposed parallel to the direction of the gravity forces.

Preferably, such a fuel cell is operated by a liquid fuel. A liquid fuel has the advantage that gas is generated during reforming of the liquid fuel. The reformation reaction structure is to be arranged in such a way that the gas, which rises through the liquid, enhances the gravity driven flow of the liquid fuel.

BRIEF DESCRIPTION OF THE DRAWINGS

The sole FIGURE shows schematically a fuel cell arrangement according to the invention.

DESCRIPTION OF A PREFERRED EMBODIMENT

Figure 1:
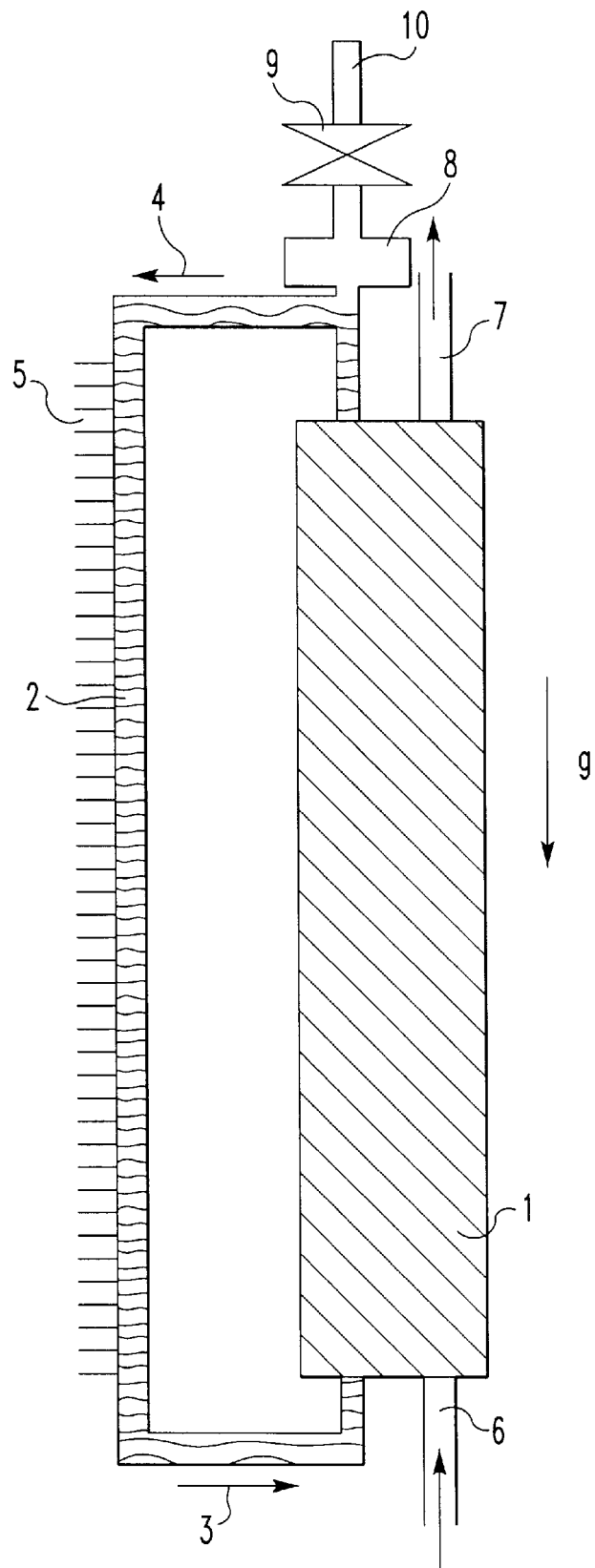

The FIGURE shows a fuel cell stack 1 which has a width to height ratio of about 1:5. It includes a flow circuit 2 with a lower reversal point 3 and an upper reversal point 4. Before passing the lower reversal point 3, the fuel flows in the direction of the gravity forces g. After passing the lower reversal point 3, the fuel flow in a direction opposite the direction of the gravity forces g. The opposite applies to the upper reversal point 4.

After passing the lower reversal point 3, the fuel flows into the fuel cell stack, wherein it is heated. As a result of being heated, the density of the fuel is decreased. Because of its reduced density, the fuel rises under the force of gravity. Unused fuel leaves the fuel tank and passes the upper reversal point 4. After passing the reversal point 4, the fuel enters the part of the circuit system 2, which is provided with cooling fins 5. The cooling fins 5 consist of a material with good heat conductivity. They increase by a multiple the surface of the return circuit pipe through which the fuel is conducted back to the bottom of the fuel stack in the direction of the gravity force g. By means of the cooling fins 5, heat is removed from the circulating system, that is, from the fuel therein and is transferred to the surrounding air. Because of the cooling of the fuel and the resulting increase in its density, the fuel flows downwardly toward the lower reversal point.

Cooling ribs and fuel cells are arranged over 80% of the length of the circulating system in order to achieve a particularly good gravity force effect.

In the fuel cell 1 liquid fuel is reformed internally. In the process, gases are generated which rise toward the upper reversal point that is, they move through the fuel cell stack 1 driven by gravity forces. They further decrease the density of the rising fluid flow thereby enhancing the fuel circulation through the stack of fuel cells. The gases generated by the reformation process such as hydrogen, CO, $CO_2$, collect at the upper reversal point and may leave the system. For this purpose, fuel cells with circulation systems have means for venting those gases at their upper reversal points. Such venting means include for example a collection chamber 8 for the gases with a subsequent pressure relief valve 9 and a product gas discharge line 10. The collection chamber 8 also serves to accommodate pressure peaks.

Alternatively, there may be provided a reformation reactor which may be arranged in the circuit between the upper reversal point 3 and the fuel cell stack 1.

A fuel supply is not shown in the drawing for simplification of the representation.

The fuel cell stack 1 includes at its bottom an inlet 6 for air used as an oxidation agent. The air is heated in the stack of fuel cells and consequently flows upwardly through the fuel cells. Air with unused oxygen leaves the fuel cell stack at its upper end through an outlet 7.

Basically, a gravity driven transport of fuel or oxidation agent is possible also in connection with the so-called dead-end type fuel cells.

The fuel cells as described herein are preferably utilized in areas which are hard to access where it is important that they operate with little or no servicing. They are particularly suitable for use on floating light buoys.

What is claim is:

1. A fuel cell arrangement comprising at least one fuel cell operated by a liquid fuel and by an oxidizing agent, a circulating system having an upper reversal point arranged above said fuel cell and a lower reversal point arranged below said fuel cell, said fuel cell being disposed between said lower and upper reversal points, and a return pipe extending from the upper reversal point to the lower reversal point and being provided with means for removing heat therefrom for circulating said fuel and being heated in said fuel cell so as to provide for movement of said fuel and said oxidizing agent through said fuel cell without power consuming pumps or heating elements.

2. A fuel cell arrangement according to claim 1, wherein said fuel cell and said means for removing heat from said return pipe extend over at least 80% of the distance between the upper and the lower reversal points.

\* \* \* \* \*